US012344465B2

(12) United States Patent
Littlewood (10) Patent No.: US 12,344,465 B2
(45) Date of Patent: Jul. 1, 2025

(54) BEARING RETENTION FOR VACUUM TANK LINKAGE

(71) Applicant: The Charles Machine Works, Inc., Perry, OK (US)

(72) Inventor: Lance D. Littlewood, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 237 days.

(21) Appl. No.: 18/319,945

(22) Filed: May 18, 2023

(65) Prior Publication Data

US 2023/0406613 A1 Dec. 21, 2023

Related U.S. Application Data

(60) Provisional application No. 63/343,288, filed on May 18, 2022.

(51) Int. Cl.
*F16C 11/04* (2006.01)
*B65D 88/06* (2006.01)
*B65D 90/62* (2006.01)
*F16C 35/02* (2006.01)

(52) U.S. Cl.
CPC .......... *B65D 90/623* (2013.01); *B65D 88/06* (2013.01); *F16C 11/045* (2013.01); *F16C 35/02* (2013.01)

(58) Field of Classification Search
CPC ........ F16C 11/04; F16C 11/045; F16C 35/02; B65D 88/06; B65D 90/623
See application file for complete search history.

(56) References Cited

U.S. PATENT DOCUMENTS

| | | | | |
|---|---|---|---|---|
| 5,044,812 | A | * | 9/1991 | Ardelt ..................... E02F 9/006 403/162 |
| 8,104,384 | B2 | * | 1/2012 | Wilkins .................. E02F 3/965 83/13 |
| 8,360,260 | B2 | | 1/2013 | Maybury, Jr. |
| 10,844,574 | B2 | | 11/2020 | Bural et al. |
| 2015/0078808 | A1 | * | 3/2015 | Halcom ................ F16C 11/045 403/119 |

* cited by examiner

*Primary Examiner* — Phillip A Johnson
(74) *Attorney, Agent, or Firm* — Tomlinson McKinstry, P.C.

(57) ABSTRACT

A bearing assembly for a door linkage. The bearing assembly is placed about a shaft which runs through a central opening in an arm, and the arm rotates about the shaft. The bearing assembly comprises a central composition bushing, a boss which is rotationally locked with the arm, and a plate. The central opening is large enough such that all the elements of the bearing assembly can be removed without disassembling the arm. The plate retains the elements of the bearing assembly in place when the arm is in use. The plate may also provide torque transmission between the boss and the arm.

22 Claims, 10 Drawing Sheets

BEARING RETENTION FOR VACUUM TANK LINKAGE

SUMMARY

The present invention is directed to a bearing assembly disposed about a shaft. The bearing assembly comprises a boss, an outer bushing, and a bushing access plate. The boss is disposed about the shaft and has opposed first and second ends. At least one of the first end and the second end is torque-transmitting. The outer bushing is disposed about the boss. The bushing access plate is defined by adjoining first and second layers. The first layer is defined by an opening complementary with the first end of the boss. The second layer is configured to restrict longitudinal movement of the first end of the boss.

In another aspect the invention is directed to a rotary support mechanism for a linkage assembly. The rotary support mechanism comprises a central shaft, a sleeve, and a connection plate. The central shaft extends along a longitudinal axis. The sleeve surrounds the central shaft and has an outer surface with at least one torque-transmitting end. The connection plate has an aperture sized to receive the sleeve and a retaining structure configured to limit movement of the sleeve relative to the connection plate along the longitudinal axis.

It should be understood that "front" and "back", "top" and "bottom" with respect to the components are non-limiting, as the machine's components will rotate with respect to an observer.

DETAILED DESCRIPTION

Figure 1:
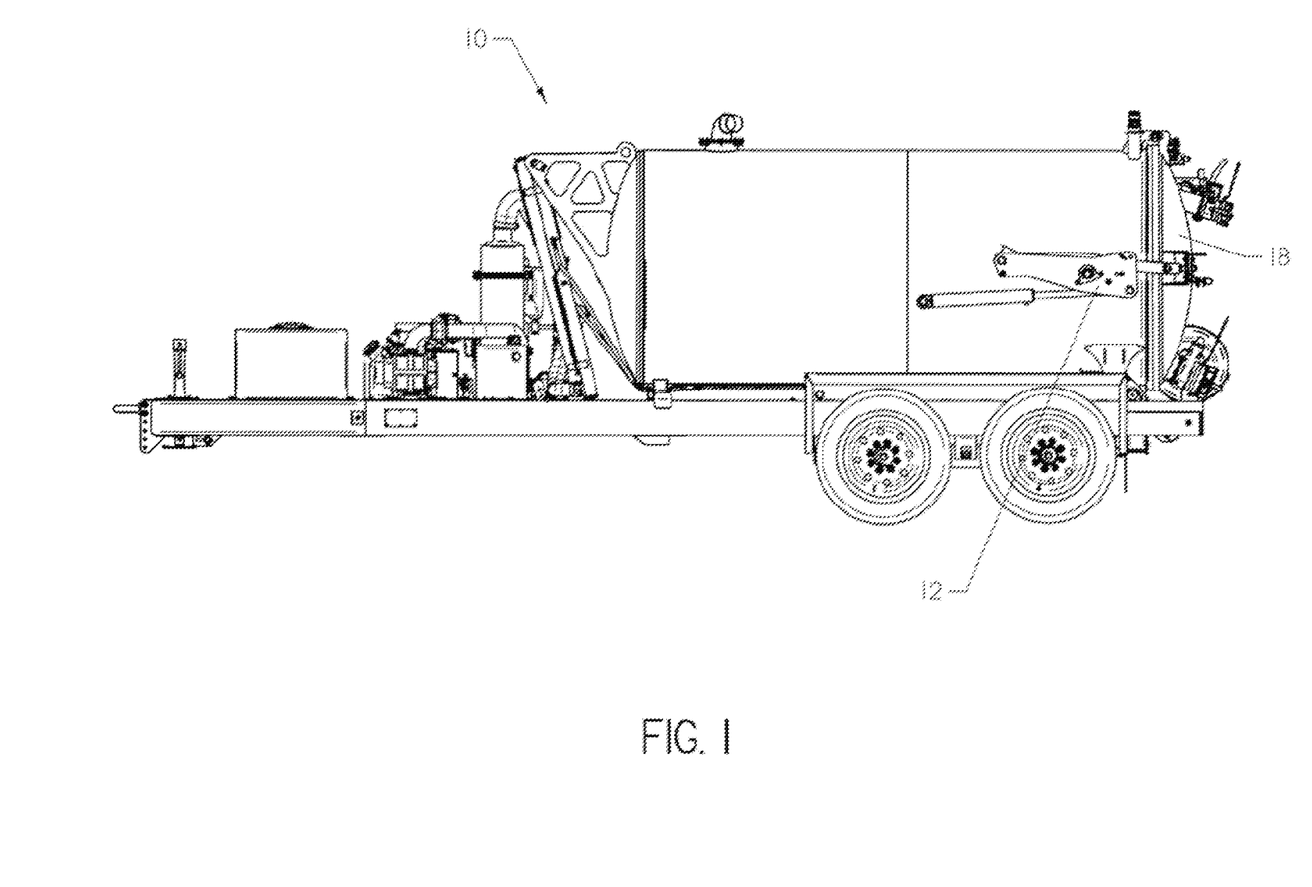
FIG. 1 is a side view of a vacuum tank with bearing retention structure within a door opening mechanism.
Figure 2A:
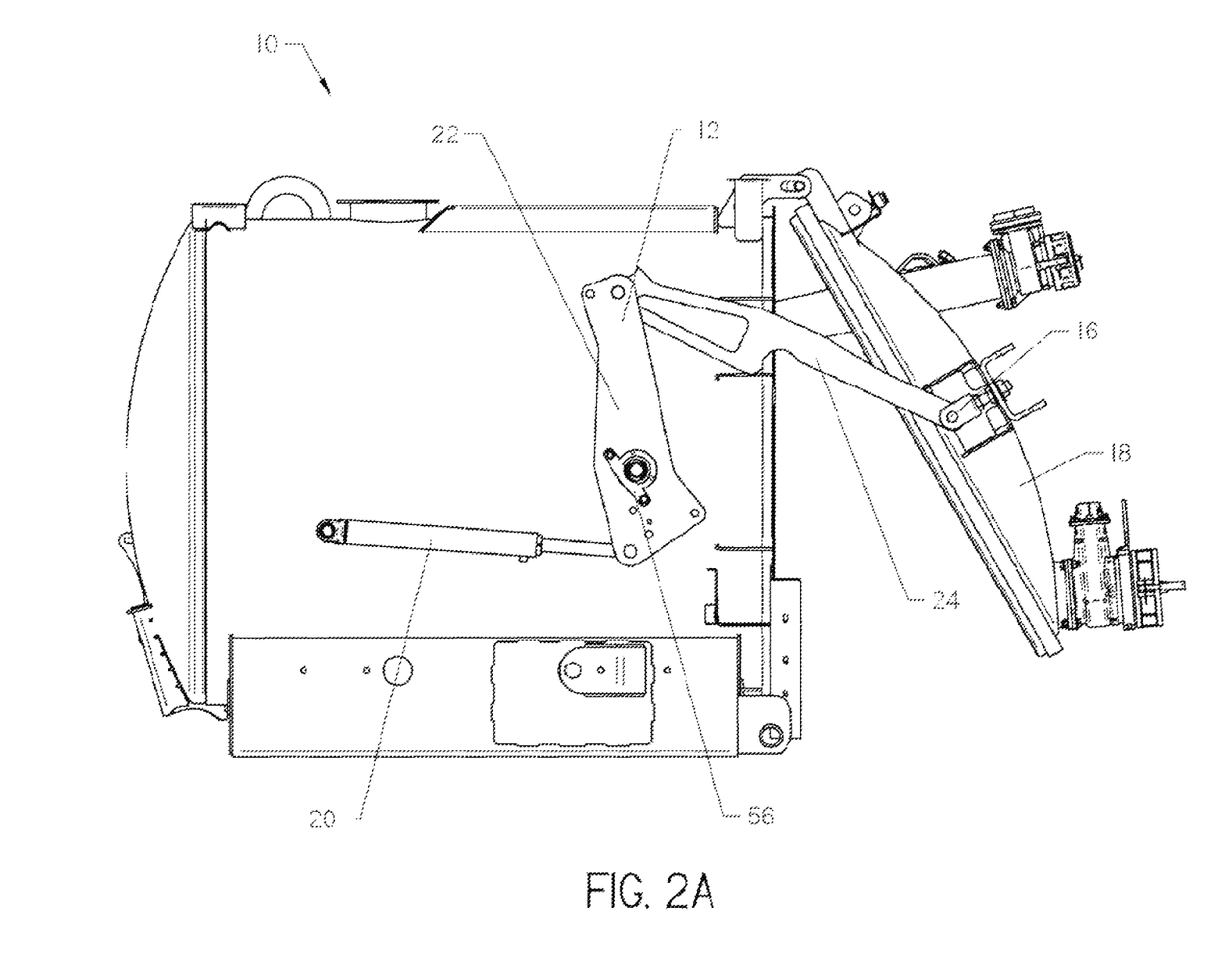
FIG. 2A is the tank assembly of FIG. 1 with the door opening mechanism extended such that the door is part-way open.
Figure 2B:
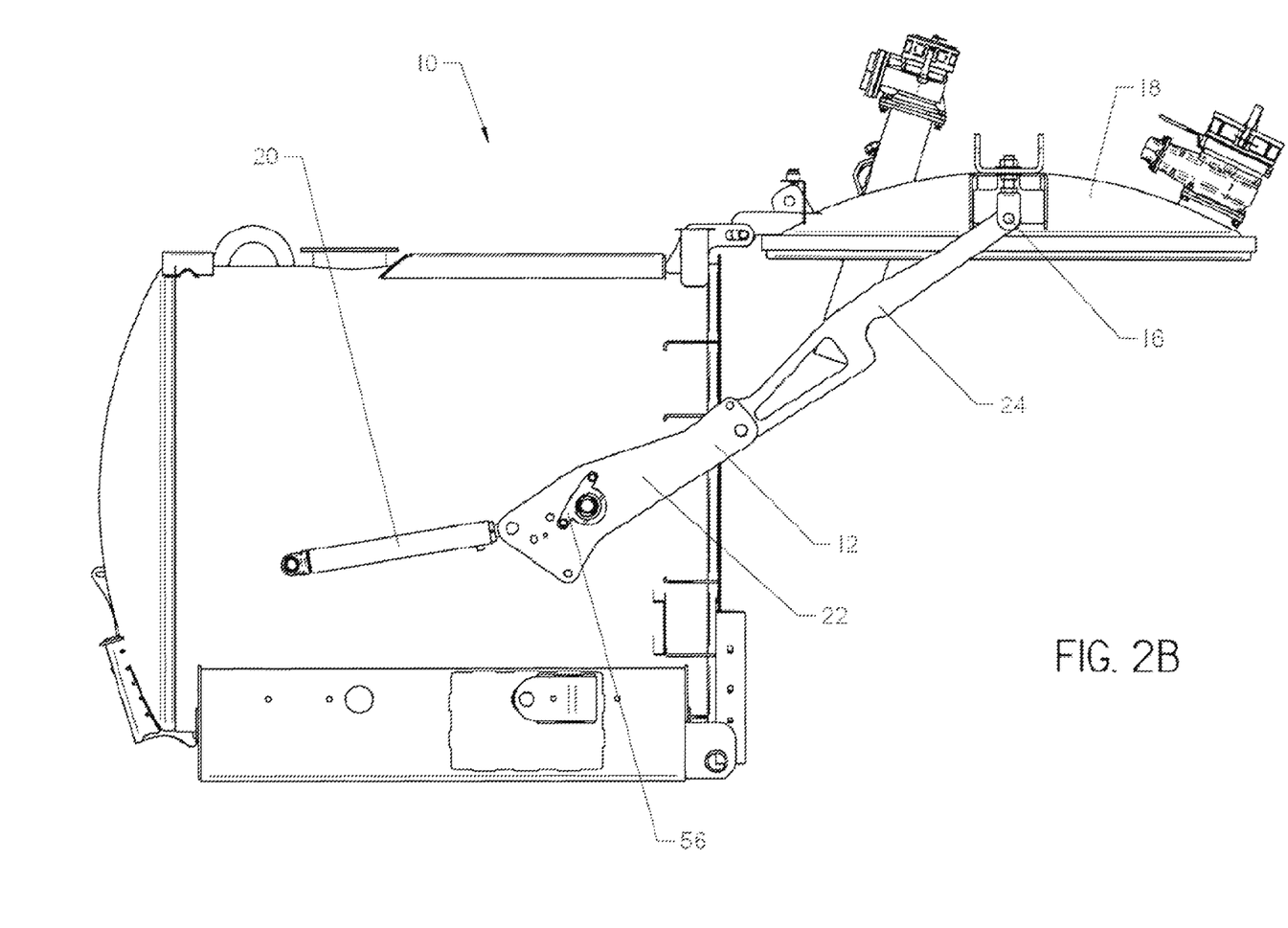
FIG. 2B is the tank of FIG. 2A with the door opening mechanism extended such that the door is fully open.

Turning now to the figures, FIGS. 1, 2A and 2B show a side view of a vacuum tank 10 having a linkage, or door opening mechanism 12, which operates to open and close a door 18. The mechanics of the door opening mechanism 12 are similar to that shown in U.S. Pat. No. 10,844,572, issued to Bural, et al., the contents of which are incorporated herein by reference.

A novel bearing mechanism 32 is used in the configuration shown. While this configuration of the door opening mechanism 12 is shown for illustrative purposes, other linkages which rotate about a shaft may benefit from the use of the novel bearing mechanism 32 of the invention.

The door opening mechanism 12 is attached at a first point 14 to the vacuum tank 10. The mechanism 12 is attached at a second point 16 to a door 18. As shown in FIGS. 2A and 2B, the mechanism 12 extends to raise the door 18. It should be understood that a similar or identical mechanism to mechanism 12 is provided on the opposite side of the vacuum tank 10.

Vacuum tanks such as tank 10 are typically mounted to a trailer or truck, and are used to remove and store spoils from near a worksite. As the tank 10 fills, spoils are kept inside because the door opening mechanism is in a closed position, preventing the door 18 from opening. The tank 10 can then be moved from the job site to a disposal site, and the spoils disposed at an appropriate location by opening the door 18 and tilting the tank 10.

Figure 3:
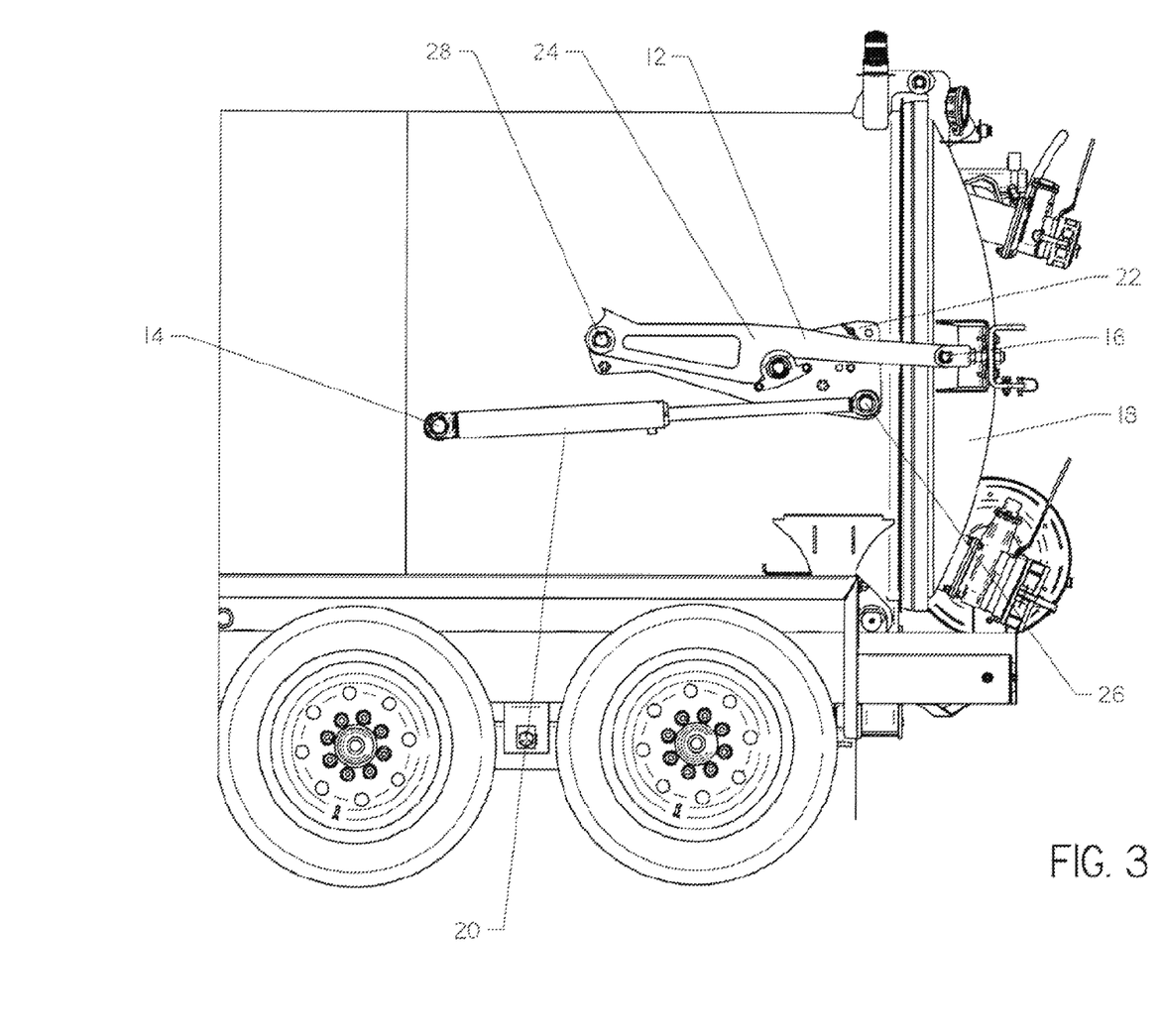
FIG. 3 is a cutaway side view of the tank as shown in FIGS. 2A and 2B, with an outer plate of a first arm of the door opening mechanism removed, a such that a second arm can be seen nested about the bearing retention structure. The door is closed in FIG. 3.
Figure 4:
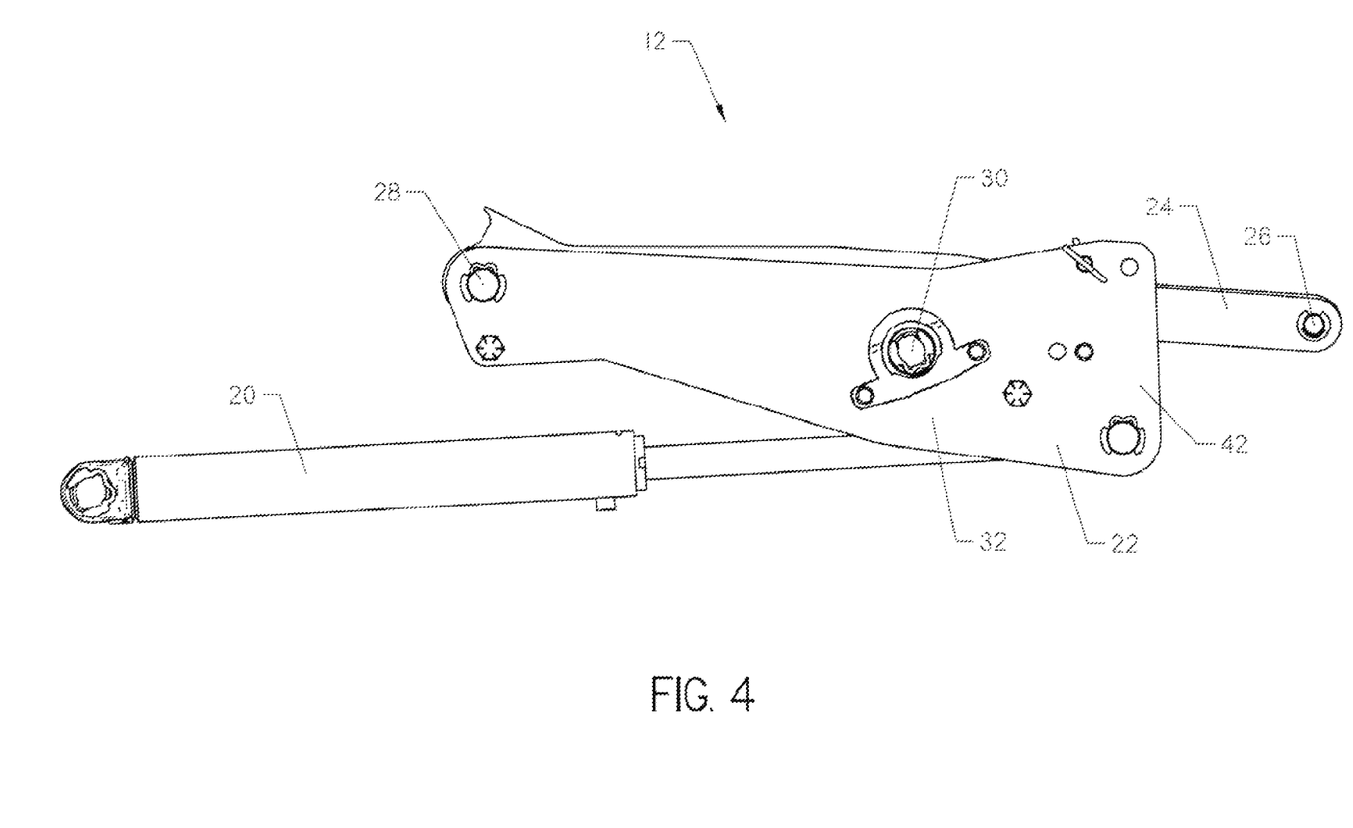
FIG. 4 is a side view of the door opening mechanism with the vacuum tank removed from the image.

With reference to FIGS. 3-4, the door opening mechanism 12 is shown in more detail. The mechanism 12 comprises a cylinder 20, a first arm 22, and a second arm 24. The cylinder 20 is attached at the first point 14 to the vacuum tank 10, and at a third point 26 to the first arm 22. The second arm 24 is attached to the door 18 at the second point 16 and to the first arm 22 at a fourth point 28.

The first arm 22 is disposed between the third 26 and fourth 28 point. The first arm 22 is further attached to the vacuum tank 10 at a central, fifth point 30. The first arm 22 rotates about the fifth point 30 due to the bearing mechanism 32 located at the fifth point.

As best shown in FIGS. 2A and 2B, the door 18 is closed by full extension of the cylinder 20, and is opened by full retraction of the cylinder. In the view shown in FIG. 2A, for example, with the cylinder 20 in an intermediate position, retraction of the cylinder will rotate the first arm 22 clockwise around fifth point 30, causing the second arm 24 to extend and open the door 18. Extension of the cylinder 20 would likewise cause the first arm 22 to rotate counter-clockwise about the fifth point 30, moving the door 18 into a closed position. On the opposite side of the tank 10, rotation direction with respect to extension and retraction of the cylinder 20 is necessarily opposite, but retraction again opens the door 18 while extension closes the door.

Figure 5:
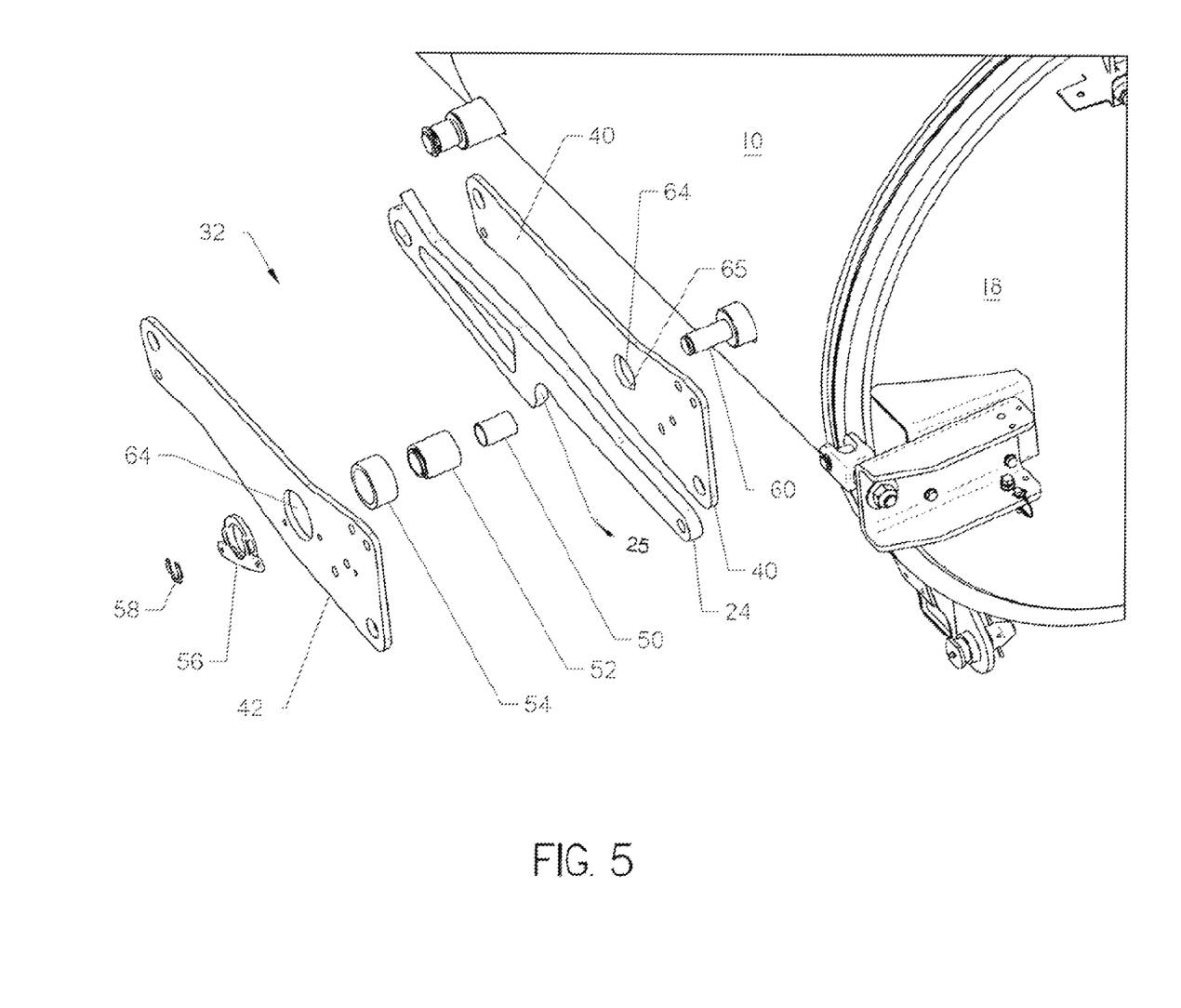
FIG. 5 is an exploded view of the first and second arm of the door opening mechanism, with elements of the bearing retention structure shown.
Figure 6:
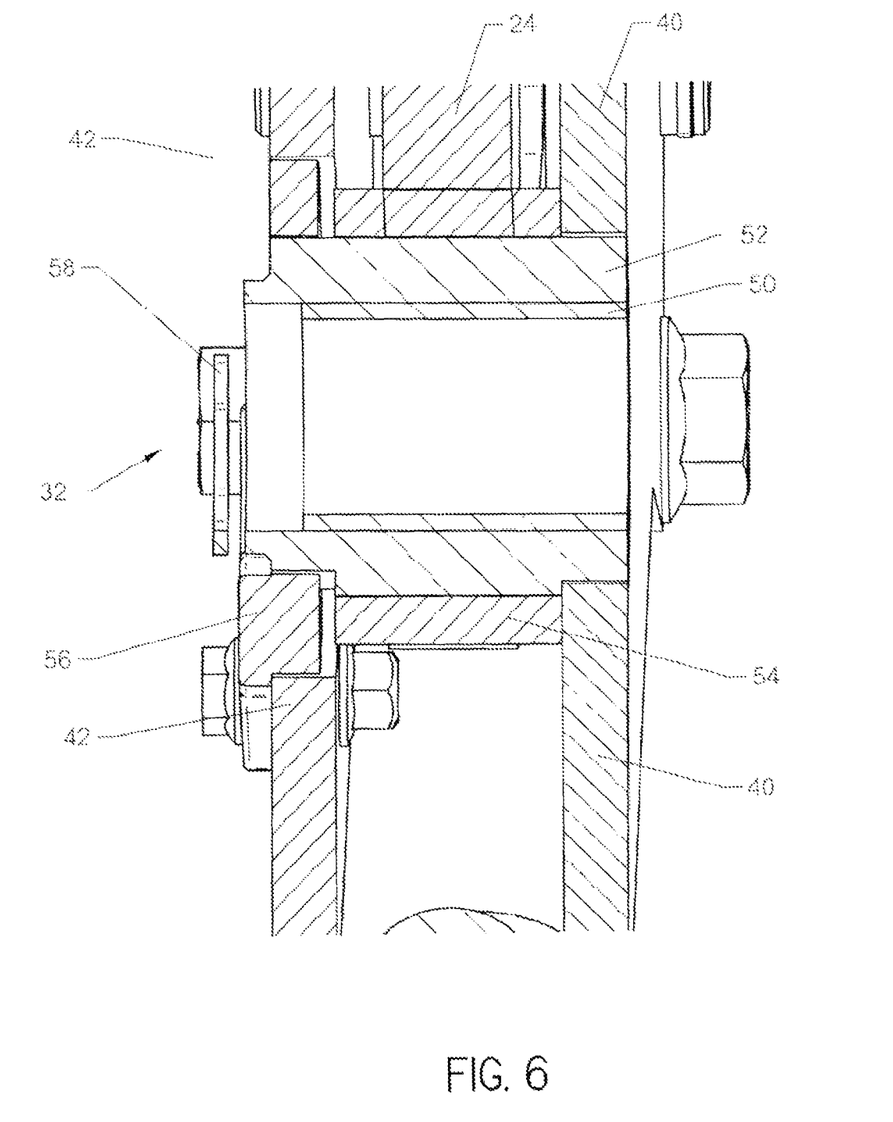
FIG. 6 is a sectional view taken along section A-A shown in the inset therein. The second arm can be seen at the top of the image, nested with the first arm.
Figure 7:
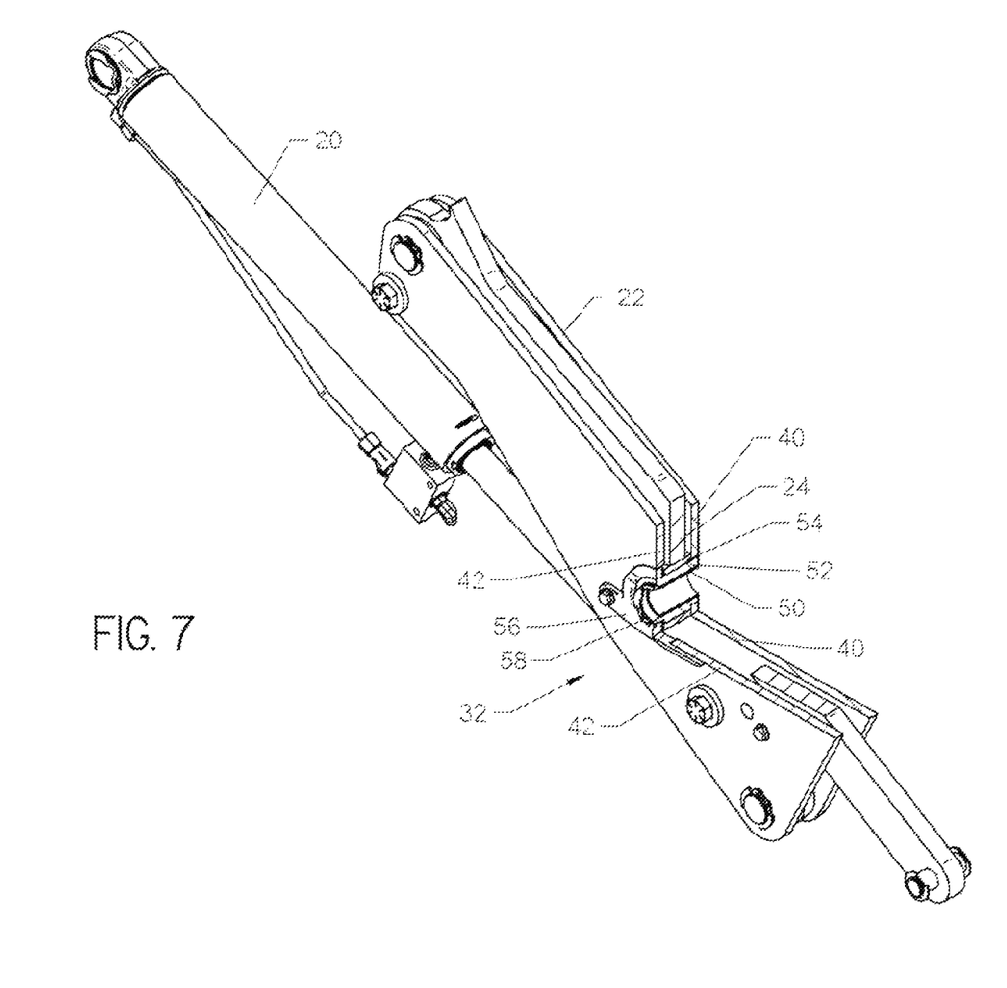
FIG. 7 is a perspective sectional view with sections taken at two separate angles such that internal structure of the bearing mechanism 32 can be seen.

As best shown in FIG. 5-7, the first arm 22 has inner 40 and outer 42 plates. The orientation of these plates is substantially parallel. In previous mechanisms, such as that shown in U.S. Pat. No. 10,844,572, the outer plate 42 would have to be removed and the cylinder 20 and second arm 24 disconnected if internal wear parts such as bushings wore out in the area around the fifth point 30. In this disclosure, however, the bearing mechanism 32 of the present invention provides a rotary support mechanism that enables the replacement of wearing parts without disassembling the first arm 22 or reducing the integrity of the door opening mechanism 12.

The bearing mechanism 32 extends through both the inner 40 and outer 42 plate of the first arm 22. The second arm 24 is configured to nest between the inner 40 and outer 42 plate and interlocks with the first arm 22 at the bearing mechanism 32.

The bearing mechanism 32 comprises a composition bushing 50, a boss 52, a roller bushing 54, a bushing access 56, and a clip ring 58. The composition bushing 50, boss 52, and roller bushing 54 are concentric sleeves, allowing these features to rotate relative to one another.

The composition bushing 50 surrounds a shaft or pin 60 extending along a longitudinal axis from the vacuum tank 10. The bearing mechanism 32 provides rotational freedom between the pin 60 and elements disposed outside of the composition bushing 50. The pin 60 may be attached to a shaft (not shown) which extends partially or completely through the vacuum tank 10.

The boss 52 surrounds the composition bushing 50. The boss 52 extends through central holes 64 which are formed in each of the inner 40 and outer 42 plate. The boss 52 comprises a central, cylindrical segment 70, a first end 72 and a second end 74. The ends 72, 74 preferably define flats 76 which may be used to place the boss 52 in torque-transmitting engagement with another element. Alternatively, the ends 72, 74 may be polygons, define a protrusion, have splines, or incorporate another torque-transmitting feature.

Figure 8A:
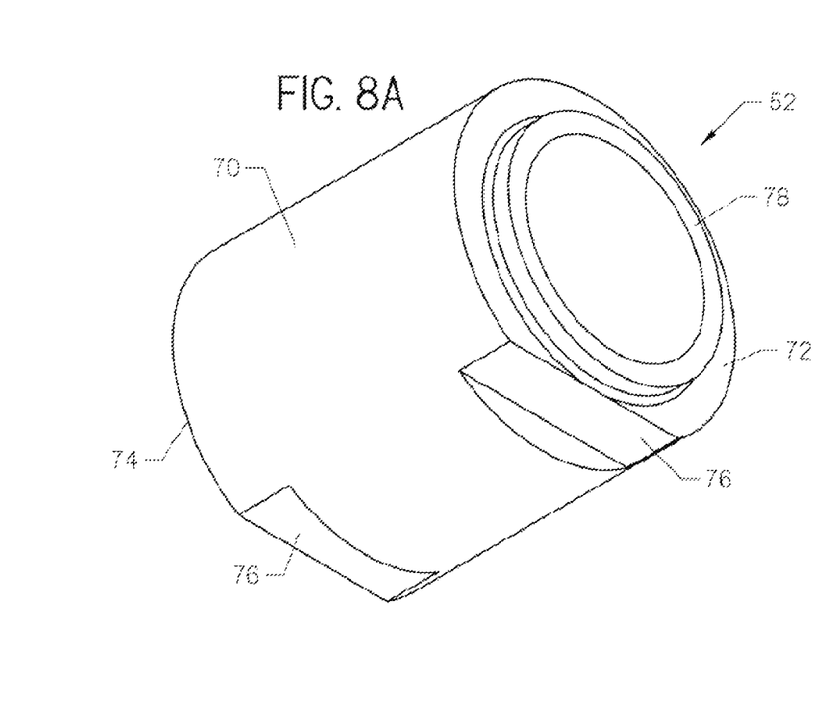
FIG. 8A is a bottom front left view of a boss for use with the bearing mechanism. The boss has two flats at its ends and a flange ring at one end.
Figure 8B:
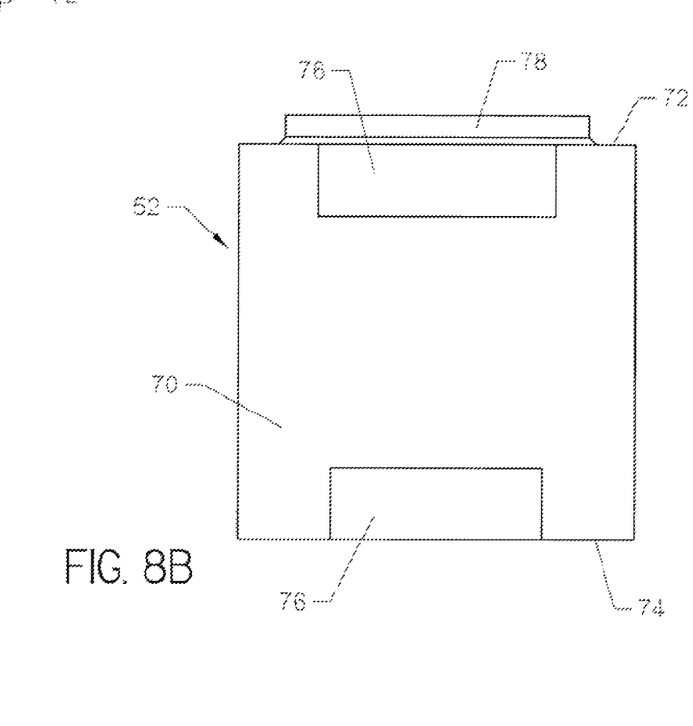
FIG. 8B is a bottom view of the boss of FIG. 8A.

The first end 72 has a flange 78 which extends beyond the flat 76. The second end 74, as shown, does not have such a flange. The boss 52 is shown in detail in FIGS. 8A-8B. The flange 78 is optional, though it aids in spacing the first arm 22 correctly on pin 60. Zero, one or two flanges could be used depending upon the particular needs.

The boss 52 mates with the central hole 64 of the inner plate 40 at its second end 74. The flat 76 of the second end 74 interacts with a corresponding flat 65 in the inner plate 40. As a result, the boss 52 rotates with the inner plate 40 without imparting that rotation to either the roller bushing 54 or the composition bushing 50.

The roller bushing 54 is disposed about the outer periphery of the cylindrical segment 70 of the boss 52. The roller bushing 54 rotates relative to the boss 52, and provides a location for the second arm 24 to nest. The second arm 24 has a radiused notch portion 25 that corresponds to an outer surface of the roller bushing 54. The roller bushing 54 may be shorter than the gap between the inner 40 and outer 42 plates, with the boss 52 extending beyond it at both ends.

Figure 9A:
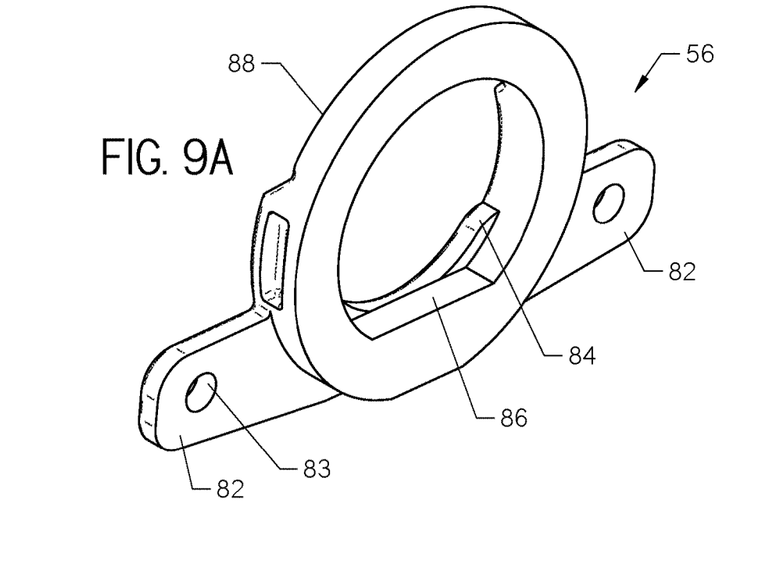
FIG. 9A is a back top right view of a bushing access retainer. The back side shown faces the outer plate of the first arm.
Figure 9B:
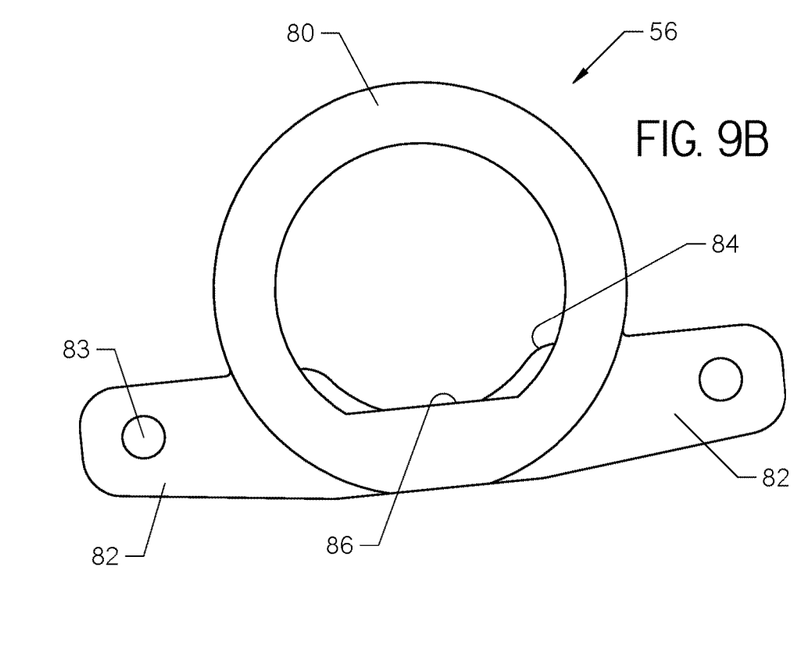
FIG. 9B is a back view thereof.

The bushing access 56 is shown in detail in FIGS. 9A-9B. The bushing access 56 comprises a ring portion 80, a pair of horizontal flanges 82, and a curved ridge 84. The ring portion 80 and curved ridge 84 form layers of the bushing access 56. The ring portion 80 faces and abuts the boss 52. The ring portion 80 has a flat 86 or other torque transmitting feature which is configured to be complementary with the flat 76 or other torque transmitting feature of the first end 72 of the boss 52. The curved ridge 84 inhibits longitudinal movement of the cylindrical segment 70 of the boss 52. The bushing access 56 includes a central aperture which has a smaller inside diameter than the outside diameter of the boss 52.

The horizontal flanges 82 are configured for attachment to an outer surface of the outer plate 42. For example, bolts (FIGS. 6-7) may be used to connect the flanges 82 to the outer plate 42 through bolt holes 83. The outer plate 42 has a central hole 64, but the central hole of the outer plate does not have a plate. Therefore, rotation imparted to the boss 52 by the inner plate 40 is passed to the boss 52, from the boss 52 to the bushing access 56 at its flat 76, and from the bushing access to the outer plate 42 through connections on the horizontal flanges 82. The bushing access 56 thus rotates with the outer plate 42, as best seen in FIGS. 1, 2A, and 2B.

The clip ring 58 is placed around elements which protrude through the bushing access 56 to inhibit longitudinal movement of the elements of the bearing mechanism 32.

When the composition bushing 50 or roller bushing 54 needs replacement, it should be understood that the clip ring 58 is first removed, then the bushing access 56 is disconnected from the outer plate 42. The central hole 64 of the outer plate 42 is larger in inside diameter than the outer diameter of each of the roller bushing, 54. Accordingly, once disconnected, each of the roller bushing 54, boss 52 and composition bushing 50 may be removed from the bearing mechanism 32 without requiring disconnection of the outer plate 42 of the first arm 22. Worn parts may be replaced, disposed in the correct orientation around the pin 60, and the bushing access 56 and clip ring 58 re-installed.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A bearing assembly disposed about a shaft, comprising:
   a boss disposed about the shaft and having opposed first and second ends, wherein at least one of the first end and the second end is torque-transmitting;
   an outer bushing disposed about the boss; and
   a bushing access plate defined by first and second adjoining layers, wherein:
      the first layer is defined by an opening complementary with the first end of the boss; and
      the second layer is configured to restrict longitudinal movement of the first end in the direction of the second layer.

2. The bearing assembly of claim 1 in which the second layer is defined by an aperture, wherein the aperture has a smaller inside diameter than an outside diameter of the boss.

3. The bearing assembly of claim 2 in which the first end of the boss is in a torque-transmitting relationship with the first layer of the bushing access plate and the second layer of the bushing access plate comprises a curved ridge.

4. A linkage assembly, comprising:
   the bearing assembly of claim 1, wherein the second end of the boss is torque-transmitting; and
   an arm having a central opening, the central opening being configured to engage with the second torque-transmitting end of the boss.

5. A linkage assembly, comprising:
   the bearing assembly of claim 1; and
   an arm having a first plate and a second plate, wherein the first plate and second plate are parallel to each other;
   wherein the second end of the boss is torque-transmitting;
   wherein the first plate has a first central opening, the first central opening being complementary to the second torque-transmitting end of the boss;
   wherein the second plate has a second central opening; and
   wherein the boss extends between the first central opening and the second central opening; and wherein the bushing access plate is attached to the second plate and at least partially covers the second central opening.

6. The linkage assembly of claim 5, in which:
the first and second plates are joined at their ends;
the shaft is disposed through the first central opening;
the first central opening is engaged with the second end of the boss;
the first end of the boss is torque-transmitting; and
the opening of the bushing access plate is engaged with the first torque-transmitting end of the boss.

7. The linkage assembly of claim 6, wherein the arm is characterized as a first arm, the first arm having a first end and a second end, and further comprising:
a second arm attached to the first arm at the first end and disposed between the first and second plates; and
a cylinder attached to the first arm at the second end;
wherein the first end rotates about the bearing assembly in response to extension and retraction of the cylinder.

8. The linkage assembly of claim 7 in which the second arm has an intermediate radiused notch corresponding to an outer surface of the outer bushing.

9. The linkage assembly of claim 8 in which the linkage assembly is characterized by a first position and a second position, wherein:
in the first position, the cylinder is fully retracted; and
in the second position, the cylinder is fully extended;
wherein the radiused notch of the second arm is positioned against the outer surface of the outer bushing when the linkage assembly is in the second position.

10. A vacuum tank, comprising:
a tank body;
a door, pivotally attached to the tank body; and
the linkage assembly of claim 7, wherein:
the shaft extends from the tank body;
the second arm is pivotally attached to the door; and
the cylinder is attached to the tank body.

11. The vacuum tank of claim 10 in which the linkage assembly is characterized by a first position and a second position, and wherein:
in the first position, the cylinder is fully retracted; and
in the second position, the cylinder is fully extended;
wherein the radiused notch of the second arm is positioned against the outer surface of the outer bushing and the door is closed when the linkage assembly is in the second position; and
wherein the door is open when the linkage assembly is in the first position.

12. The bearing assembly of claim 1 further comprising:
an inner bushing disposed about the central shaft and within the boss;
in which the inner bushing and the outer bushing rotate relative to the boss.

13. A rotary support mechanism for a linkage assembly, comprising:
a central shaft extending along a longitudinal axis;
a sleeve surrounding the central shaft, the sleeve having an outer surface with at least one torque-transmitting end;
a connection plate having an aperture sized to receive the sleeve and a retaining structure configured to limit movement of the sleeve relative to the connection plate along the longitudinal axis.

14. The rotary support mechanism of claim 13, wherein the retaining structure comprises:
a ridge interrupting the aperture, such that the aperture has a smaller inner diameter than an outer diameter of the second sleeve at the longitudinal position of the ridge; and
a clip ring positionable on the central shaft.

15. The rotary support mechanism of claim 14 in which the sleeve comprises a flange, wherein the flange has a smaller outer diameter than the inner diameter of the aperture at the ridge, and wherein the flange is disposed through the aperture.

16. A linkage assembly, comprising:
a first arm having a central hole, a first end, and a second end;
a second arm, pivotally attached to the first arm at the first end;
a cylinder, pivotally attached to the first arm at the second end; and
the rotary support mechanism of claim 13; wherein:
the connection plate is attached to the first arm and overlies the central hole, and
the sleeve is situated within the central hole of the first arm and the at least one torque-transmitting end of the sleeve is in torque-transmitting relationship with the aperture of the connection plate.

17. The linkage assembly of claim 16 wherein the sleeve comprises a second torque-transmitting end, and further comprising:
a fourth arm, attached to the first arm at the first end and at the second end, and parallel to the first arm;
wherein the shaft and sleeve are disposed through the fourth arm at a second central hole, and
wherein the second central hole is characterized by a torque-transmitting feature in contact with the second torque transmitting end of the sleeve.

18. The linkage assembly of claim 17 wherein the sleeve is characterized as a first sleeve and wherein the rotary support mechanism further comprises a second sleeve surrounding the first sleeve, the second sleeve having an inner surface in contact with the outer surface of the first sleeve, and an outer surface, wherein the central hole of the first arm has a greater inside diameter than an outside diameter of the second sleeve.

19. The linkage assembly of claim 18 in which the second arm has a radial notch, wherein the radial notch is configured to conform to a portion of the outer surface of the second sleeve.

20. The linkage assembly of claim 18 further comprising a third sleeve, wherein the third sleeve surrounds the central shaft and has an inner surface in contact with the central shaft, and wherein the third sleeve has an outer surface in contact with an inner surface of the first sleeve.

21. The linkage assembly of claim 20 in which the third sleeve and the second sleeve rotate relative to the first sleeve.

22. The rotary support mechanism of claim 13 in which the torque-transmitting end includes a flat section.

* * * * *